(No Model.)
R. LOVE.
FARM GATE.
No. 569,026. Patented Oct. 6, 1896.
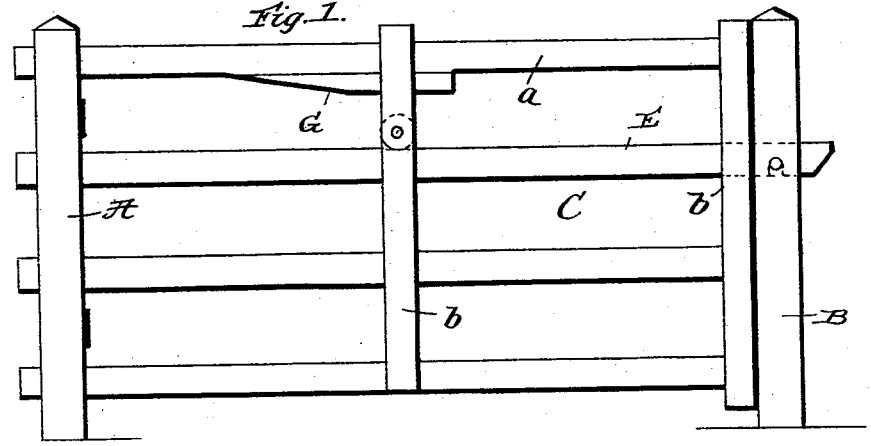
Fig. 1.
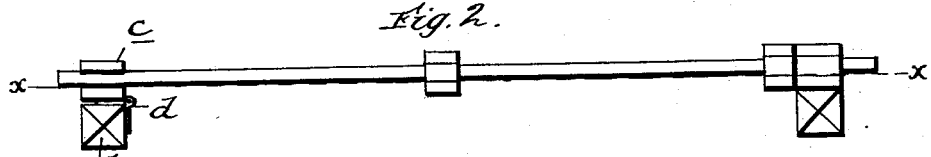
Fig. 2.
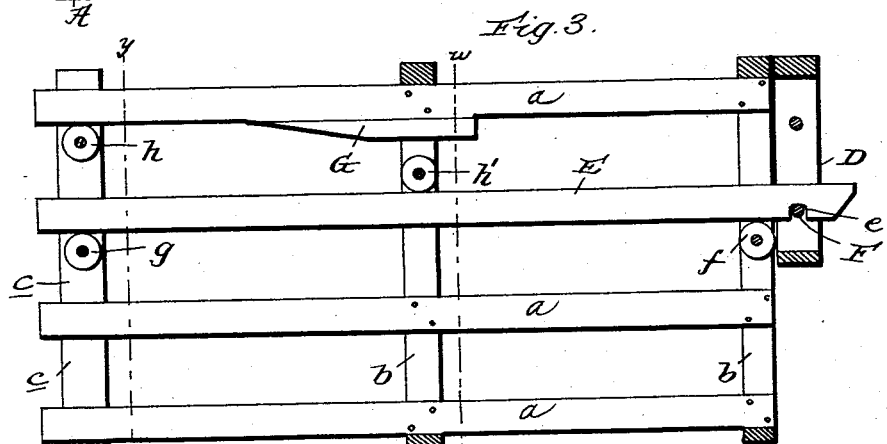
Fig. 3.
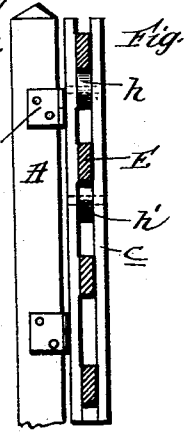
Fig. 4. Fig. 5.
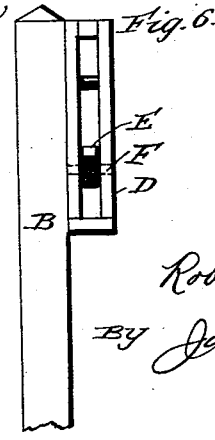
Fig. 6.
Witnesses:
C. H. Raeder
H. L. James
Inventor
Robert Love
By James J. Sheehy
Attorney
THE NORRIS PETERS CO., PHOTO-LITHO., WASHINGTON, D. C.

UNITED STATES PATENT OFFICE.

ROBERT LOVE, OF LOYALHANNA, PENNSYLVANIA.

FARM-GATE.

SPECIFICATION forming part of Letters Patent No. 569,026, dated October 6, 1896.

Application filed September 23, 1895. Serial No. 563,447. (No model.)

*To all whom it may concern:*

Be it known that I, ROBERT LOVE, a citizen of the United States, residing at Loyalhanna, in the county of Indiana and State of Pennsylvania, have invented certain new and useful Improvements in Gates; and I do declare the following to be a full, clear, and exact description of the invention, such as will enable others skilled in the art to which it appertains to make and use the same.

My invention relates to improvements in that class of gates which are known as "sliding and swinging gates," and its novelty and advantages will be fully understood from the following description and claims when taken in conjunction with the accompanying drawings, in which—

Figure 1 is an elevation of my improved gate in its closed position. Fig. 2 is a plan view of the same. Fig. 3 is a longitudinal section taken in the plane indicated by the line $x\ x$ of Fig. 2. Fig. 4 is a transverse section taken in the plane indicated by the line $y\ y$ of Fig. 3. Fig. 5 is a transverse section taken in the plane indicated by the line $w\ w$ of Fig. 3, and Fig. 6 is an end view showing the gate in its closed position.

In the said drawings similar letters designate corresponding parts in all of the views, referring to which—

A indicates one of the posts of my improved gate.

B indicates the other post, and C indicates my improved sliding and swinging gate. This gate C preferably comprises the longitudinal bars $a$ and the upright bars $b$, which are arranged in pairs upon opposite sides of the bars $a$ at the middle and swinging end of the gate, as shown, and are fixedly connected thereto by nails or other suitable fastening devices. The said gate C at one end extends between two fixedly-connected upright bars $c$, which are connected by hinges $d$ to the post $a$, whereby it will be seen that when the gate is unlatched, as presently described, it may be readily swung to a position at right angles to that shown in Fig. 1 to permit the passage of a vehicle between the posts A B.

The post B is provided upon one side with a keeper D, which is designed to receive the endwise-movable latch-bar E of the gate and is provided with a bolt F, designed to engage the notch $e$ in the under side of the said bar, as better shown in Fig. 3, so as to secure the gate in its closed position. The latch-bar E extends between the upright bars $b$ of the gate and the upright bars $c$, and it is arranged upon rollers $f\ g$, carried by the end bars $b$ and the bars $c$, and forms a track for the roller $h'$, carried by the bars $b$, at the middle of the gate, as shown, for a purpose presently described.

G indicates a block which is connected to the upper longitudinal bar $a$ of the gate and is designed and adapted to take upon a roller $h$, carried by the upright bars $c$, and thereby take the weight of the gate off the latch-bar E, as will be presently described.

When the gate C is in its closed position, it is supported upon the latch-bar E, which also serves to secure it in its closed position, as shown. When it is desired to open the gate, it is simply necessary to slide it toward the left until the block G takes upon the roller $h$ of the upright bars $c$. This will raise the gate C and take the weight of the same off the latch-bar E, which may then be lifted out of engagement with the bolt $e$ and shoved endwise toward the left, so as to clear the frame D when the gate is swung around to a position at right angles to that shown in Fig. 1. When it is desired to close the gate, it is simply necessary to swing it back to position shown in Figs. 1 and 2 and shove the latch-bar E toward the right until its notch $e$ engages the bolt F of the keeper, and then shove the gate C toward the right on the bar E until its end abuts against the keeper-frame, as shown.

It will be seen from the foregoing that my improved gate is very cheap and simple, and that while it is adapted to be easily operated it embodies no parts that are likely to get out of order.

The gate shown and described is a horizontal gate designed for use on a level; but it is obvious that my improvements may be embodied in a sidehill-gate as well as in a horizontal gate, and I therefore do not desire to be understood as confining myself to a horizontal gate.

When desirable, the gate C may be provided between its forward upright bars $b$ with a wheel or roller. (Not illustrated.) This roller bears on the latch-bar E when the gate is shut, and thereby takes the weight off the middle of the latch-bar and prevents the same from sagging or sinking.

Having described my invention, what I claim is—

The combination of the upright posts, the upright bars $c$, connected in a hinged manner to one of the posts and carrying rollers $g$, $h$, a keeper connected to the other post and having a bolt F, the gate proper comprising the upper longitudinal bar extending between the upright bars $c$, above the roller $h$, and having the beveled projection or block adapted to take upon said roller, the lower longitudinal bars also extending between the bars $c$, and the upright bars $b$, fixedly connected to the longitudinal bars and carrying rollers $f$, $h'$, and the endwise-movable latch-bar extending between the bars $b$, and also between the bars $c$, and arranged below the roller $h'$, and above the rollers $f$, $g$, and having the notch in its under side adapted to engage the bolt of the keeper substantially as specified.

ROBERT LOVE.

Witnesses:
MARY J. HUFFMAN,
REUBEN J. HUFFMAN.